United States Patent
Venkat et al.

(10) Patent No.: US 6,379,556 B1
(45) Date of Patent: Apr. 30, 2002

(54) RECOVERY OF IODIDE FROM CHEMICAL PROCESS WASTEWATER

(75) Inventors: Ed Venkat, Woodbridge; Ralph J. Magliette, Piscataway; Donald McKinney, Howell, all of NJ (US); Alan S. Michaels, Chestnut Hill, MA (US)

(73) Assignee: Merck & Co., Inc., Rahway, NJ (US)

( * ) Notice: Subject to any disclaimer, the term of this patent is extended or adjusted under 35 U.S.C. 154(b) by 0 days.

(21) Appl. No.: 09/394,325

(22) Filed: Sep. 13, 1999

Related U.S. Application Data

(60) Provisional application No. 60/100,276, filed on Sep. 14, 1998.

(51) Int. Cl.⁷ .................................................. C02F 1/42
(52) U.S. Cl. ........................ 210/670; 210/683; 423/501
(58) Field of Search ................................ 210/670, 683; 423/501

(56) References Cited

U.S. PATENT DOCUMENTS

| | | | | |
|---|---|---|---|---|
| 2,945,746 A | * | 7/1960 | Shaw | 210/683 |
| 3,050,369 A | * | 8/1962 | Mills | 423/501 |
| 3,352,641 A | * | 11/1967 | Nakamura et al. | 423/501 |
| 5,356,611 A | * | 10/1994 | Herkelmann et al. | 210/670 |
| 5,413,999 A | | 5/1995 | Vacca et al. | 514/231.5 |
| 5,624,567 A | | 4/1997 | Colombo | 210/662 |
| 5,646,148 A | | 7/1997 | Huff et al. | 514/253 |
| 5,728,840 A | | 3/1998 | Askin et al. | 548/217 |

OTHER PUBLICATIONS

Derwent World Patent Index Accession No. 94–221536/27 (JP06157008), "Recovery of iodine from waste liq. contg. iodine and/or inorganic iodine cpd.", 1994, Assignee—Godo Shigen Sangyo KK.

Derwent World Patent Index Accession No. 94–222581/27 (JP06158372), "Recovery of iodine from waste soln. contg. an organic iodine cpd.", 1994, Assignee—Godo Shigen Sangyo KK.

Derwent World Patent Index Accession No. 94–206106/25 (JP06144802), "Recovery of iodine from waste liq. contg. organic iodine cpd.", 1994, Assignee—Gido Shigen Sangyo KK.

Derwent World Patent Index Accession No. 93–174450/21 (SU1738752), "Extn. of iodine from aq. waste or brine", 1993, Ignatova et al., Assignee—Crimea Iodobrom Res. Prodn. Assoc.

* cited by examiner

Primary Examiner—Ivars Cintins
(74) Attorney, Agent, or Firm—Kenneth R. Walton; Melvin Winokur

(57) ABSTRACT

The recovery of iodide from chemical process wastewater is accomplished by loading the wastewater containing iodide onto a strongly basic anion-exchange resin in free-base form; eluting the sorbed iodide from the resin with aqueous strong acid (e.g., hydrochloric acid); loading the iodide-rich cuts onto a weakly basic anion-exchange resin in free-base form; and eluting the sorbed iodide with aqueous base (e.g., sodium hydroxide). The recovered iodide typically has sufficient purity to permit its re-use in the chemical process.

26 Claims, No Drawings

RECOVERY OF IODIDE FROM CHEMICAL PROCESS WASTEWATER

This application claims the benefit of U.S. Provisional Application No. 60/100,276, filed Sep. 14, 1998.

FIELD OF THE INVENTION

The invention relates to a process for the recovery of iodide from chemical process wastewater. More particularly, the process of the invention involves a two-stage ion-exchange system comprising a strongly basic anionic resin and a weakly basic anionic resin for iodide recovery from wastewater, such as the wastewater resulting from the manufacture of indinavir sulfate, the active ingredient of the HIV protease inhibitor CRIXIVAN®.

BACKGROUND OF THE INVENTION

The recovery of expensive reagents from chemical process wastewater has been known to be an important factor in process economics for years and more recently known to be mandatory for environmental protection. More particularly, there has been considerable interest in and effort devoted to the recovery of iodide, because iodide is a relatively expensive material of limited availability, and, from an environmental perspective, because iodide is known to be toxic to certain fresh water aquatic organisms at very low concentrations (e.g., less than 1 mg/L). The recovery of iodide using anion exchange resin technology has been problematic, because iodide has a strong affinity for anionic exchange resins and the resin-bound iodide has been difficult to desorb, resulting thereby in unsatisfactory iodide recovery and in the loss of resin activity due to iodide enrichment.

Much of the iodide recovery effort has been directed to the isolation of iodide from low-concentration sources (<1 g/L) such as sea water. In those cases in which ion-exchange technology was used, desorption was attempted with alkali and found to offer inadequate recovery of iodide. Accordingly, oxidation of the iodide to free iodine was resorted to followed by reduction to iodide. This process was accompanied by all the safety and handling problems associated with free iodine. For example, Yamaguchi et al. disclose in Japanese Published Application No. JP 92-350078 a process of oxidizing or reducing an effluent which contains iodine and/or inorganic iodine compounds, followed by allowing the free iodine so formed to be adsorbed by a strongly basic anionic exchange resin which had adsorbed ionic iodine under acidic conditions. The adsorbed iodine is then allowed to react with sodium bisulfite and/or sodium sulfite and/or sodium hydroxide solution which results in elution of hydriodic acid. This is oxidized under acidic conditions and the free iodine obtained is purified by conventional procedures.

SUMMARY OF THE INVENTION

The present invention is a process which employs a two-stage anion-exchange method for recovery of up to about 99% of iodide present in chemical process wastewater as an aqueous solution of an iodide salt, typically an alkali metal iodide salt such as NaI. The process of the invention is suitable for use with chemical process wastewaters having very low to very high concentrations of iodide (e.g., from less than about 0.1 g/L to more than about 100 g/L), and optionally also contaminated with organic compounds, including solvents, and other inorganic ions. The anion-exchange resins suffer little or no loss of activity in the process due to iodide enrichment and thus can be re-used.

The resulting iodide salt typically has sufficient purity to permit its re-use as a reagent in the chemical process. Importantly, the process of the present invention does not require oxidation/reduction and does not require the use of any expensive or toxic chemicals (i.e., the process can effectively employ readily available, inexpensive acids and bases). The use of relatively inexpensive chemicals in the process of the invention, combined with the ability to re-use the iodide salt recovered via the process, provides a significant economic advantage over conventional recovery processes which convert iodide to iodine. Furthermore, because the process of the invention can recover a substantial proportion of the iodide from the wastewater, it provides a significant environmental benefit.

DETAILED DESCRIPTION OF THE INVENTION

The present invention is a process for recovering iodide from chemical process wastewater which comprises:

(A) treating the wastewater containing iodide, and optionally other inorganics and organics, with a strongly basic anion-exchange resin in free-base form and washing the resin with aqueous solvent to remove materials not sorbed on the resin;

(B) treating the strongly basic resin with aqueous strong acid to desorb the iodide as HI;

(C) passing the HI solution from Step B through a weakly basic anion-exchange resin in free-base form and washing the resin with aqueous solvent to remove unsorbed materials; and (D) treating the weakly basic resin with aqueous base to desorb the iodide as an iodide salt.

In a preferred embodiment, the process of the invention further comprises (E1) regenerating the desorbed weakly basic resin by washing with aqueous solvent. Step E1 permits re-use of the resin in step C of the process.

In another preferred embodiment, the process of the invention further comprises (E2) regenerating the desorbed strongly basic resin by washing the resin with aqueous base and then with aqueous solvent. Step E2 permits re-use of the resin in step A of the process.

In still another preferred embodiment, the process of the invention further comprises step E1 and step E2 as respectively set forth above.

In Step A, the strongly basic anion exchange resin in free-base form is suitably a polymer functionalized to contain quaternary ammonium groups, which groups are characterized by not readily associating with hydroxide ions in aqueous media, in analogy with the behavior of strong bases such as NaOH. As a result, the strongly basic resin can function over the entire pH range. The strongly basic resin is highly dissociated and sorbs or separates essentially all anionic species. The selectivity preference ranking of strongly basic resins for common anions is $SO_4^=>I^->NO_3^->Br^->Cl^->OH^-$. Suitable strongly basic anion-exchange resins include, but are not limited to, Amberlites IRA 400, IRA-410, IRA-402, IRA-458 and IRA-440c, all from Rohm & Haas. Amberlite IRA 400 is the preferred resin.

IRA 400 is an anion exchange resin with quaternary ammonium functionality in the chloride or hydroxide form, and has a porous gel bead structure based on a styrene divinylbenzene copolymer. IRA 400 consists of spherical particles and has an effective size of about 450 $\mu$m and a total exchange capacity of 1.4 meq/mL wet. IRA-402 resin has a quaternary ammonium functionality in the chloride form and is chemically the same as IRA-400, but with lower crosslinkage and more porosity. IRA-440c is another gel resin having a styrene divinylbenzene copolymer structure and quaternary ammonium functionality, with characteristics similar to IRA-400, but having tight particle size control (effective size=about 500 $\mu$m). IRA-458 is an acrylic divinyl benzene strongly basic anionic gel resin in the chloride form. IRA-458 has a particle size of about 470 $\mu$m and a total exchange capacity of 1.2 meq/mL wet. IRA-410 is an anion exchange resin having a styrene divinylbenzene copolymer structure with dimethylethanolamine functionality (chloride form), a particle size of about 480 $\mu$m, and a total exchange capacity of 1.4 meq/mL wet.

The resin is typically used in a column, although agitation with the wastewater in a vat, or other receptacle in batch mode, followed by filtration is also satisfactory. The resin column has a ratio of length/diameter of from about 2/1 to about 4/1, preferably from about 3/1 to about 4/1 (e.g., about 3/1). The wastewater flow rate through the resin column is typically in the range of from about 2 to about 40 mL/min/cm$^2$ (from about 0.5 to about 10 gal/min/ft$^2$) of column cross-section, and preferably from about 4 to about 20 mL/min/cm$^2$ (from about 1 to about 5 gal/min/ft$^2$) of column cross-section.

The resin with the sorbed iodide is washed with a volume of aqueous solvent at least about equal to the volume of wastewater loaded onto the resin. About two volumes of wash solvent are usually sufficient to clear the resin of other loosely bound or entrapped inorganic and organic materials, although further washing is not deleterious.

As used herein, "aqueous solvent" (alternatively referred to herein as "wash solvent") means a solvent system comprising water and optionally a water-soluble organic co-solvent. Suitable organic solvents include, but are not limited to, low molecular weight aliphatic monohydric alcohols (e.g., methanol, ethanol, isopropanol, n-propanol, t-butanol, n-butanol and so forth), $C_2$–$C_8$ polyhydric alcohols (e.g., ethylene glycol, glycerol, etc.), $C_1$–$C_4$ nitriles (e.g., acetonitrile and propionitrile), polyethylene glycols, and ethers (e.g., tetrahydrofuran, dioxane, diethyl ether, methyl-tert-butyl ether, and Cellosolves® such as ethylene glycol monomethyl ether, diethylene glycol monomethyl ether, diethylene glycol monoethyl ether, and triethylene glycol monomethyl ether). Preferred co-solvents are the monohydric alcohols, especially methanol. The aqueous solvent is most preferably water (i.e., no co-solvent). When the aqueous solvent does contain an organic co-solvent, water suitably comprises at least about 70 volume percent (e.g., from about 70 to about 95 volume percent), typically comprises at least about 75 volume percent (e.g., from about 75 to about 95 volume percent), preferably comprises at least 85 volume percent (e.g., from about 85 to about 95 volume percent), and more preferably comprises at least about 90 volume percent, of the total volume of solvent.

In Step B, the iodide is desorbed from the resin as HI by treating the resin from Step A with aqueous strong acid such as HCl or HBr. The term "aqueous strong acid" refers herein to any inorganic acid at a concentration of no more than about 80 percent acid by weight. The concentration of the acid is generally in the range of from about 0.1 to about 6 N, typically in the range of about 2 to about 6 N, and preferably in the range of about 3N to about 5N (e.g., about 4N). The volume of acid employed is typically from about 0.5 to about 2 times the volume of wastewater originally loaded onto the resin. The acid is preferably HCl.

In Step C, the HI solution from Step B is passed through a weakly basic anion-exchange resin in free-base form. The resin is suitably a polymer functionalized to contain primary, secondary or tertiary amino groups. These groups are normally uncharged when in contact with weakly acidic, neutral or alkaline solutions (i.e., pH>6.0). However, when in contact with strongly acidic solutions (i.e., pH<4.0), the amino groups become protonated and acquire a positive charge, retaining anions present in solution to maintain electrostatic neutrality. Under these conditions, the resin behaves as an anion exchanger. Thus, when brought into contact with the HI solution from step B, which is strongly acidic (typically having a pH of about 1), the free-base amino groups become fully protonated and retain, as exchangeable anions, iodide and any other anions which may be present in solution. Thus, the free-base form of the resin may be regarded as a sorbent for strong acids from their aqueous solutions, and is thereby converted to an anion-exchange resin. In its protonated (anion-exchange) form, the amino resin exhibits selectivity for anions little different from that of strong-base anion exchangers, which increases with the valency or polarizability of the anion (i.e., $SO_4^-$>$I^-$>$NO_3^{->Br-}$>$Cl^-$). Suitable resins include, but are not limited to, Amberlyst A-21 and Amberlites IRA-67, IRA-93, IRA-94 and IRA-35, all from Rohm & Haas.

Amberlyst A-21 is a weakly basic, anionic, macroreticular polymer available in a water-moist, free base form. It consists of opaque spherical beads, and has an acid site concentration of 4.7 meq/g, an effective particle size of 350 to 470 $\mu$m, a porosity of 0.20 mL/g, and an average pore -diameter of 400 Å. Amberlite IRA-67 is a weakly basic, anion exchange resin available as a gel in free base form. IRA-67 contains tertiary amine functionality in a crosslinked acrylic matrix, consists of clear, white spherical beads, and has a total exchange capacity of 1.6 meq/mL (free base) and an effective particle size of 360 $\mu$m. Amberlite IRA-93 is a weakly basic anion exchange resin which is a styrene divinylbenzene polymer with a polyamine functionality. IRA-93 is available in free base form and has an effective particle size of about 410 $\mu$m and a total exchange capacity of 1.3 meq/mL wet. Amberlite IRA-94 resin is also a styrene divinylbenzene polymer with a polyamine functionality available in free base form and has an effective particle size of about 410 $\mu$m and a total exchange capacity of 1.2 meq/mL wet.

The conditions employed in Step C are the same as those described above for Step A. The resin is then washed as described in Step A. The aqueous solvent employed in Step C can be the same or different from the solvent employed to wash the resin in Step A, but is preferably the same solvent. Most preferably, water is employed as the aqueous solvent in both steps A and C.

In Step D, the iodide is desorbed from the resin by treatment (i.e., elution) with aqueous base. The term "aqueous base" refers herein to any inorganic base at a concentration of no more than about 6 N. The base is typically employed at a concentration in the range of from about 0.1 to about 5N, and preferably from about 0.1 to 1N. The base is preferably an alkali metal hydroxide such as sodium hydroxide or potassium hydroxide, and is more preferably sodium hydroxide. The volume of base (e.g., alkali metal hydroxide) should be sufficient to desorb all of the iodide from the resin and is typically from about 6 to about 8 times the volume of the resin. In one embodiment, the iodide is desorbed by gradient elution with at least two aliquots of a first alkali metal hydroxide, followed by at least two aliquots of a second, more concentrated alkali metal hydroxide. The concentration of the second hydroxide is typically from about 5 times (5×) to about 15 times (15×), and preferably from about 8 times (8×) to about 12 times (12×) (e.g., about 10 times (10×)), the concentration of the first hydroxide. Gradient elution allows for the removal of other anions prior to eluting the iodide in a single fraction of high purity. As an example of this embodiment, the iodide is desorbed as an alkali metal iodide salt (e.g., NaI) by gradient elution with at least two aliquots of about 0.1N alkali metal hydroxide (e.g., NaOH) followed by at least two aliquots of about 1.0N alkali metal hydroxide (e.g., NaOH).

Step E1, the desorbed weakly basic resin resulting from step D is regenerated by washing with an aqueous solvent as defined above to permit re-use of the resin. As used herein, the term "regenerated" and its variants (e.g., "regenerating") mean that the resin is converted to free-base form. The resin is suitably washed with from about 2 to about 8 volumes of aqueous solvent, and is typically washed with from about 2 to about 4 volumes of aqueous solvent, relative to the volume of resin. The preferred wash solvent is water (i.e., no organic co-solvent).

In Step E2, the desorbed strongly basic resin resulting from step B is regenerated (i.e., converted to free-base form) by washing the resin with aqueous base as defined above and then with aqueous solvent as defined above, to permit re-use of the resin. The regenerated resin typically has a pH of at least about 9 (e.g., from about 9 to about 10). The resin is suitably washed with from about 1 to about 25 volumes, preferably from about 1 to about 5 volumes, of aqueous base, and then with about 1 to about 50 volumes, preferably about 3 to about 35 volumes, of aqueous solvent, relative to the volume of resin. The aqueous base is preferably sodium hydroxide (e.g., 4 N NaOH), and the aqueous solvent is preferably water (e.g., deionized water).

It is understood that step E2 can be conducted at any time following completion of step B; i.e., it can be initiated before, during, or after step C, step D, or step E1.

The wash solvent employed in either step E1 or step E2 can be the same as or different from the wash solvent(s) employed in other process steps. Preferably, however, the same solvent is employed in all process steps. Most preferably, water is employed as the solvent in all process steps.

The process of the invention can typically achieve from about 85 to about 99% recovery, more typically can achieve from about 90 to about 99% recovery, and preferably can achieve at least about 99% recovery of the iodide from the wastewater as an aqueous solution of an iodide salt, preferably an alkali metal iodide, and more preferably NaI. The concentration of the iodide is suitably in the range of from about 10 to about 100 g/L, typically is from about 20 to about 80 g/L, and more typically is from about 25 to about 50 g/L (e.g., about 35 g/L). The recovered iodide often has sufficient purity for direct use as a reagent in a subsequent batch of the original chemical process.

The process is suitable for use in recovering iodide salt from wastewater comprising the following:

| Component | Amount (g/L) |
|---|---|
| sodium ($Na^+$) | 0–50 |
| potassium ($K^+$) | 0–50 |
| ammonium ($NH_4^+$) | 0–10 |
| chloride ($Cl^-$) | 0–100 |
| bromide ($Br^-$) | 0–10 |
| sulfate ($SO_4^{2-}$) | 0–100 |
| iodide ($I^-$) | 0.1–100 |
| succinimide | 0–50 |
| methanol | 0–100 |
| isopropyl acetate | 0–100 |
| TOC | 0–500 |

*TOC = total organic carbon

The process of this invention has general utility for isolating iodide from any chemical process wastewater, and has been found to be particularly useful from both an economic and environmental standpoint in recovering iodide from wastewater resulting from the manufacture of indinavir or a salt thereof, especially indinavir sulfate, the active ingredient in the HIV-protease inhibitor CRIXIVAN®, the well known anti-HIV drug. Further description of indinavir and its preparation is provided by U.S. Pat. No. 5,413,999, the disclosure of which is incorporated herein by reference in its entirety. The indinavir process steps in which the iodide-containing wastewater is generated are shown schematically as follows:

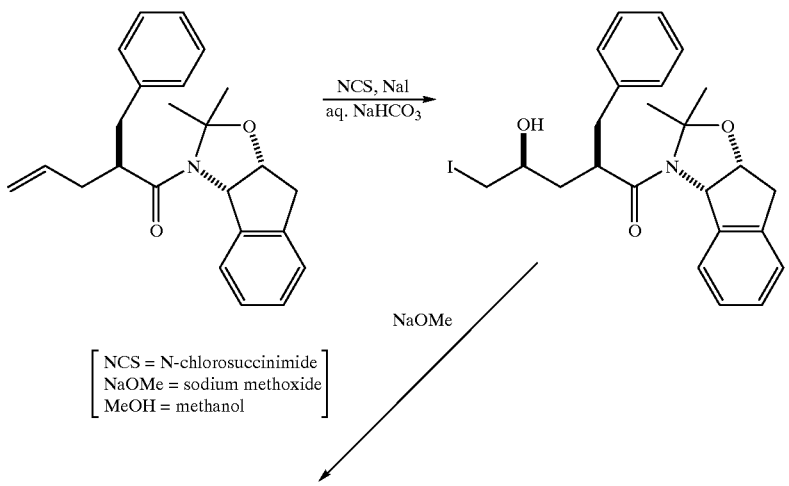

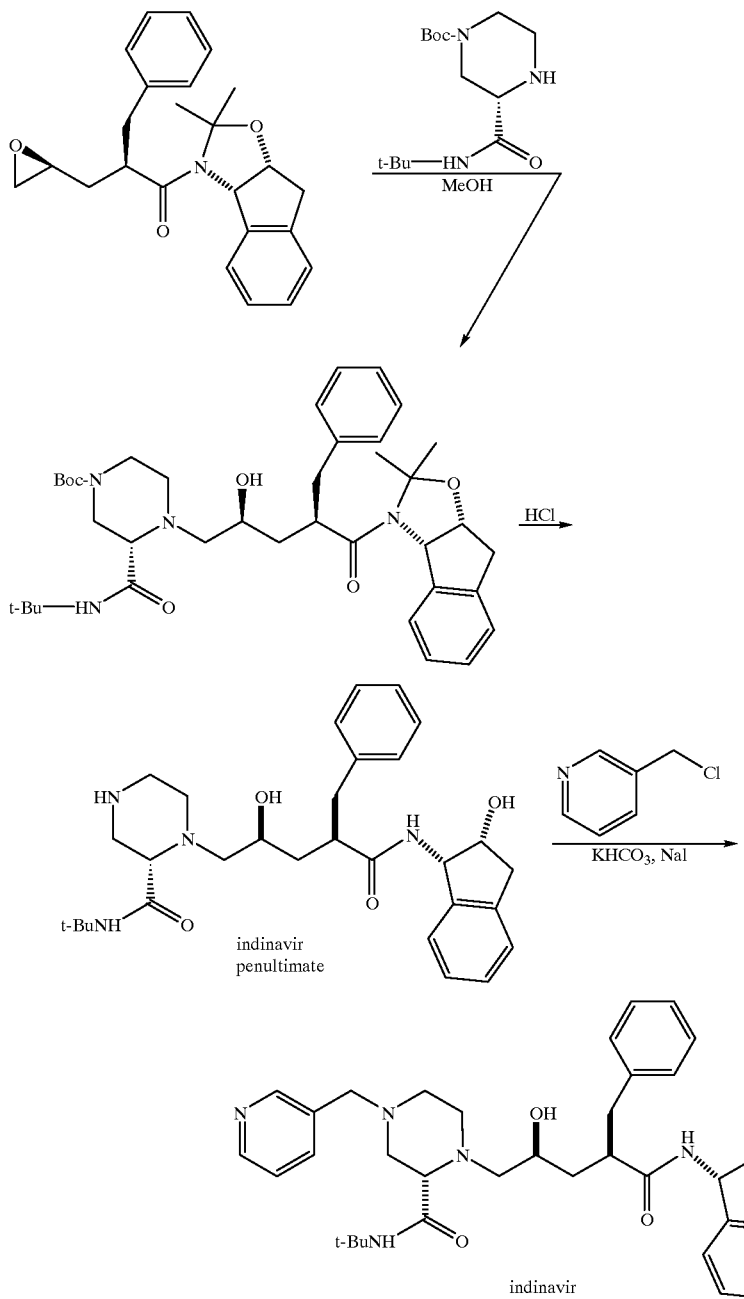

The indinavir free base can subsequently be converted to a salt, for example, to the sulfate salt by treatment with sulfuric acid. Further description of the steps leading to the indinavir penultimate can be found in U.S. Pat. No. 5,728,840, the disclosure of which is herein incorporated by reference in its entirety.

The indinavir sulfate wastewater typically includes the following components:

| Component | Amount (g/L) |
| --- | --- |
| sodium (Na$^+$) | 5–20 |
| potassium (K$^+$) | 5–20 |

-continued

| Component | Amount (g/L) |
| --- | --- |
| ammonium (NH$_4^+$) | 0.01–3 |
| chloride (Cl$^-$) | 5–30 |
| bromide (Br$^-$) | 0.1–3 |
| sulfate (SO$_4^-$) | 5–30 |
| iodide (I$^-$) | 5–50 |
| succinimide | 5–40 |
| methanol | 5–50 |
| isopropyl acetate | 5–50 |
| TOC | 5–100 |

The indinavir sulfate wastewater is also characterized by typically having a pH in the range of from about 5 to about 9, total solids in the range of from about 5 to about 150 g/L, and a conductivity in the range of from about 1 to about 500 milli mhos/cm.

The process of this invention is also useful for recovering iodide from wastewaters resulting from the production of other hydroxylpentaneamide compounds derivable from the indinavir penultimate, when said compounds are produced using the above-described scheme for indinavir manufacture with a suitable alkylating agent employed in place of 3-chloromethylpyridine. The process of the invention can be used, for example, to recover iodide resulting from the production of the compounds described in Example 16 of U.S. Pat. No. 5,413,999 and the compounds described in U.S. Pat. No. 5,646,148. The disclosure of U.S. Pat. No. 5,646,148 is herein incorporated by reference in its entirety. In particular, the process of the invention is useful for recovering iodide from wastewater resulting from the production of Compound A or a salt thereof (e.g., the sulfate salt). Compound A, a potent HIV protease inhibitor, is N-(2(R)-hydroxy-1(S)-indanyl)-2(R)-phenylmethyl-4(S)-hydroxy-5-(1-(4-(2-benzo[b]furanylmethyl)-2(S)-N'-(t-butylcarboxamido)-piperazinyl)pentaneamide. Compound A has the following structure:

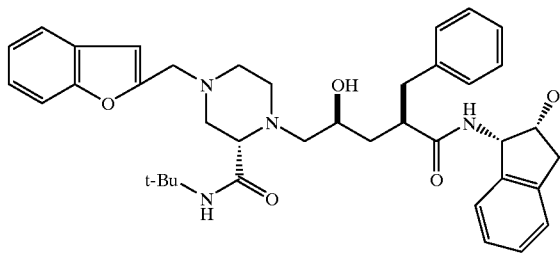

Further description of Compound A and its preparation can be found in U.S. Pat. No. 5,646,148. The process for making Compound A in which iodide-containing wastewater is generated is analogous to the process described above for making indinavir, except that 2-chloromethylbenzofuran is employed instead of 3-chloromethylpyridine. Compound A sulfate salt wastewater is substantially the same in composition as indinavir sulfate wastewater in both the type and amount of components.

The wastewater from the process for manufacturing indinavir sulfate is used herein only to exemplify the general process and is not to be construed as limiting the general applicability of the process of the invention, which is suitable for use in recovering iodide from iodide-containing chemical process wastewaters generally.

EXAMPLE

Iodide Recovery from Indinavir Sulfate Wastewater

Step A: Treatment of Wastewater with Amberlite IRA-400

Wastewater from the indinavir process had a pH of 7.1 and the following composition:

| Component | Amount (g/L) |
|---|---|
| sodium | 10.3 |
| potassium | 12.1 |

-continued

| Component | Amount (g/L) |
|---|---|
| ammonium | <1 |
| chloride | 23.2 |
| bromide | 0.6 |
| sulfate | 18.6 |
| iodide | 31.4 |
| succinimide | 23.4 |
| methanol | ~30 |
| isopropyl acetate | ~30 |
| TOC | 43.2 |

The indinavir sulfate wastewater (500 mL) was loaded onto a 15 cm long×5 cm diameter glass column containing 300 mL of Amberlite IRA 400 resin (wet) in free-base form. The flow rate was 4.2 mL/min/cm² (=82.5 mL/min). The column was then washed with 1.0 L of deionized water.

Step B: Desorption of Iodide

The iodide was desorbed from the resin by percolating 350 mL of 4N HCl through the resin at a flow rate of 0.54 mL/min/cm² (=10.5 mL/min) followed by a column wash with 350 mL of deionized water.

Step C: Sorption on Amberlyst A-21

The acidic (pH=0.5–1.5) IRA 400 column cuts used for sorption on Amberlyst A-21 had the following composition (in g/L):

| succinimide | TOC | Cl⁻ | Br⁻ | SO4⁻ | I⁻ | pH |
|---|---|---|---|---|---|---|
| <0.00001 | <0.001 | 31.6 | 0.2 | 1.2 | 34 | ~1 |

Iodide-rich IRA 400 resin column cuts (2 L) were loaded onto a 15 cm long×5 cm diameter glass column containing 300 mL of Amberlyst A-21 resin (wet) in free-base form. The flow rate was 4.2 mL/min/cm² (=82.5 mL/min). The column was then washed with 1.0 L of deionized water.

Step D: Desorption of Iodide from Amberlyst A-21

Desorption of iodide and regeneration of the resin to the free-base functionality was accomplished by eluting with four 300 mL aliquots of 0.1 N NaOH and then three 300 mL aliquots of 1N NaOH at a flow rate of 0.54 mL/min/cm² (=10.5 mL/min).

Step E1: Regeneration of the Amberlyst A-21 Resin

Subsequent to iodide desorption in step D, the A-21 resin column was washed with 1 L of deionized water for later re-use.

Step E2: Regeneration of the Amberlite IRA400 Resin

Subsequent to iodide desorption in step B, the IRA-400 resin column was regenerated by washing with 350 ml of 4 N NaOH, and then with 1000 mL of deionized water, both washings at a flow rate of 0.54 mL/min/cm² (=10.5 mL/min).

The Amberlite IRA 400 anion-exchange resin provided iodide recovery of >99% from the wastewater. The IRA 400 resin was more selective for iodide compared to other anions in this particular wastewater. Succinimide readily passed through the anion-exchange column with a rejection efficiency of >99%. TOC removal through the anion-exchange column was ~100%. Hence, virtually all organic solvents and succinimide were removed during the initial column loading and water wash steps. Sulfate and bromide removal during the initial column loading and water wash steps were ~40 and 100%, respectively. An iodide concentration of ~34 g/L was achieved using 4N HCl as the eluant.

In the second stage, the A-21 anion exchange resin provided iodide recovery (as sodium iodide) of >99% from the IRA400 resin column cuts from the first stage. Amberlyst A-21 resin is more selective for HI compared to HBr and HCl. This results in enrichment of the column with respect to iodide. Thus, virtually all of the iodide was sorbed to the A-21 resin at the expense of chloride. Residual organic solvents and anions were removed in the initial A-21 resin column loading and water wash steps. A sodium iodide concentration of ~35 g/L in the recovered cuts was achieved using 0.1 to 1.0 N NaOH gradient.

What is claimed is:

1. A process for recovering iodide from chemical process wastewater which comprises:
   (A) treating the wastewater containing iodide, and optionally other inorganics and organics, with a strongly basic anion-exchange resin in free-base form and, when the wastewater contains at least one other inorganic or at least one organic, washing the resin with aqueous solvent to remove materials not sorbed on the resin;
   (B) treating the strongly basic resin with aqueous strong acid to desorb the iodide as HI;
   (C) passing the HI solution from Step B through a weakly basic anion-exchange resin in free-base form and, when the wastewater contains at least one other inorganic or at least one organic, washing the resin with aqueous solvent to remove unsorbed materials; and
   (D) treating the weakly basic resin with aqueous base to desorb the iodide as an iodide salt.

2. The process of claim 1 wherein the strongly basic anion-exchange resin is selected from the group consisting of AMBERLITE IRA-400, AMBERLITE IRA-410, AMBERLITE IRA-402, AMBERLITE IRA-458 and AMBERLITE IRA-440c.

3. The process of claim 2 wherein the strongly basic anion-exchange resin is AMBERLITE IRA-400.

4. The process of claim 1 wherein the iodide is desorbed from the strongly basic anion-exchange resin in step B with from about 2 to about 6 N HCl.

5. The process of claim 1 wherein the weakly basic anion-exchange resin is selected from the group consisting of AMBERLYST A-21, AMBERLITE IRA-67, AMBERLITE IRA-93, and AMBERLITE IRA-94.

6. The process of claim 5 wherein the weakly basic anion-exchange resin is AMBERLYST A-21.

7. The process of claim 1 wherein the iodide is desorbed from the weakly basic anion-exchange resin in step D with from about 0.1 to about 1.0N alkali metal hydroxide.

8. The process of claim 7, wherein the alkali metal hydroxide is NaOH.

9. The process of claim 1, wherein treating by desorption in step D is by gradient elution with at least two aliquots of a first alkali metal hydroxide, followed by at least two aliquots of a second, more concentrated alkali metal hydroxide.

10. The process of claim 9, wherein the concentration of the second hydroxide is from about 5 times to about 15 times that of the first hydroxide.

11. The process of claim 1 wherein the aqueous solvent in both step A and step C is water.

12. The process of claim 1 which further comprises (E1) regenerating the desorbed weakly basic resin by washing the resin with aqueous solvent.

13. The process of claim 1 which further comprises (E2) regenerating the desorbed strongly basic resin by washing the resin with aqueous base and then with aqueous solvent.

14. The process of claim 1 wherein the wastewater prior to treatment comprises:

| Component | Amount (g/L) |
|---|---|
| sodium ($Na^+$) | 0–50 |
| potassium ($K^+$) | 0–50 |
| ammonium ($NH_4^+$) | 0–10 |
| chloride ($Cl^-$) | 0–100 |
| bromide ($Br^-$) | 0–10 |
| sulfate ($SO_4^-$) | 0–100 |
| iodide ($I^-$) | 0.1–100 |
| succinimide | 0–50 |
| methanol | 0–100 |
| isopropyl acetate | 0–100 |
| TOC | 0–500. |

15. The process of claim 1, wherein the wastewater prior to treatment comprises:

| Component | Amount (g/L) |
|---|---|
| sodium ($Na^+$) | 5–20 |
| potassium ($K^+$) | 5–20 |
| ammonium ($NH_4^+$) | 0.01–3 |
| chloride ($Cl^-$) | 5–30 |
| bromide ($Br^-$) | 0.1–3 |
| sulfate ($SO_4^-$) | 5–30 |
| iodide ($I^-$) | 5–50 |
| succinimide | 5–40 |
| methanol | 5–50 |
| isopropyl acetate | 5–50 |
| TOC | 5–100. |

16. The process of claim 15, wherein the strongly basic anion-exchange resin is AMBERLITE IRA-400.

17. The process of claim 16, wherein the weakly basic anion-exchange resin is AMBERLYST A-21.

18. The process of claim 15, wherein the wastewater is wastewater resulting from the manufacture of indinavir sulfate.

19. The process of claim 18, wherein the strongly basic anion-exchange resin is AMBERLITE IRA-400.

20. The process of claim 19, wherein the weakly basic anion-exchange resin is AMBERLYST A-21.

21. The process of claim 1, wherein the wastewater is wastewater resulting from the manufacture of indinavir or a salt thereof.

22. The process of claim 21, wherein the wastewater results from the manufacture of indinavir sulfate.

23. The process of claim 1, wherein the wastewater is wastewater resulting from the production of Compound A or a salt thereof, wherein Compound A is N-(2(R)-hydroxy-1 (S)-indanyl)-2(R)-phenylmethyl-4(S)-hydroxy-5-(1-(4-(2-benzo[b]furanylmethyl)-2(S)-N'-(t-butylcarboxamido) piperazinyl)pentaneamide.

24. The process of claim 23, wherein the wastewater results from the production of the sulfate salt of Compound A.

25. The process of claim 1, wherein the wastewater comprises iodide and at least one other inorganic or at least one organic.

26. The process of claim 1, wherein the strongly basic anion-exchange resin comprises a polymer functionalized to contain quaternary ammonium groups and the weakly basic anion-exchange resin comprises a polymer functionalized to contain primary, secondary or tertiary amino groups.

* * * * *